Feb. 8, 1966    S. V. POLEVOY    3,233,846
TWO SPEED FISHING REEL

Filed Feb. 18, 1963    2 Sheets-Sheet 1

INVENTOR.
STEPHEN V. POLEVOY
BY
Knox & Knox

INVENTOR.
STEPHEN V. POLEVOY
BY
Knox & Knox

United States Patent Office 3,233,846
Patented Feb. 8, 1966

3,233,846
TWO SPEED FISHING REEL
Stephen V. Polevoy, San Diego, Calif.
(3302 Ybarra Road, Spring Valley, Calif.)
Filed Feb. 18, 1963, Ser. No. 259,183
9 Claims. (Cl. 242—84.54)

The present invention relates generally to two speed fishing reels and more particularly to a reel having novel means for driving the spool at two different speeds.

The primary object of this invention is to provide an improved two speed transmission for a fishing reel in which the speed change may be effected without going through a neutral or free wheeling position.

A further object of this invention is to provide an improved two speed transmission for a fishing reel in which the main drive gear is shiftable relative to the high speed idler gears as well as to the driven pinion.

A still further object of this invention is to provide an improved fishing reel in which means for shifting gears is operatively and directly associated with the winding crank.

A further and important object is to provide an improved and effective reel drag or braking mechanism constructed of a minimum number of parts and in which no forces resulting from adjustment of the braking mechanism are transmitted to the reel body parts.

Finally, it is an object to provide a fishing reel of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawing.

Figure 1:
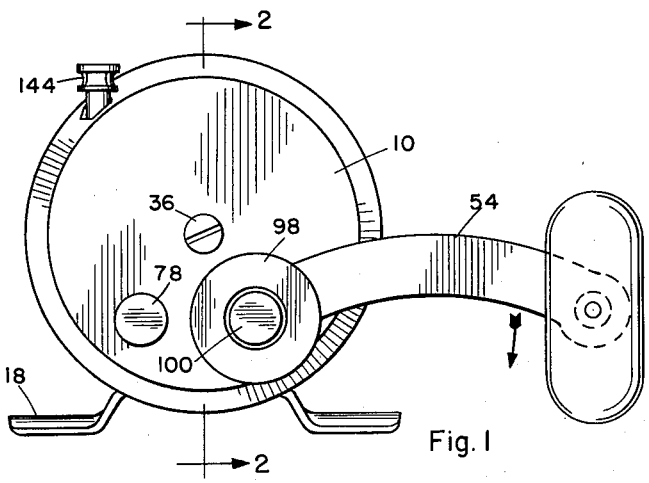
FIGURE 1 is a side elevation view of my improved reel.
Figure 2:
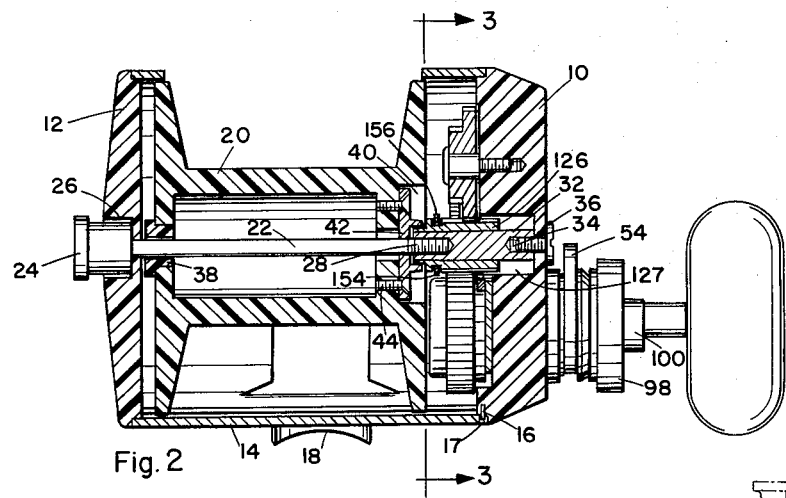
FIGURE 2 is a sectional view on the line 2—2 of FIGURE 1.

A generally cylindrical frame 14 having the usual reel stand 18 for connection to a fishing rod is provided with a head cap 10 and an end plate 12. The frame, head cap and end plate are secured together by shaft means here shown as an elongated shaft 22 and a stud shaft 32. A pin 16 on head cap 10 engages a slot 17 on frame 14 to locate the head cap with respect to the frame. Shaft 22 is provided with an integral knurled head 24 partially enclosed by recess 26 in end plate 12. The other end of shaft 22 is threaded as at 28 into the inner end of stud shaft 32. The other end of stud shaft 32 is provided with a threaded recess 34 for cooperation with screw 36 thereby securing stud shaft 32 in recess 127 of head cap 10. A spool 20 is journalled on the fixed shaft 22 by means of bearings mounted in either end of the spool, only one of which is shown at 38. It is understood that these bearings may be of any conventional type either plain sleeve bearings, anti-friction bearings or a combination thereof. The end plate 12, frame 14 and spool 20 may be removed from head cap 10 by unscrewing the shaft 22 from socket 30. It is to be understood that shaft portion 32 is intended to be permanently secured to the head cap 10 and may be a unitary part thereof. The screw means 36 is representative only and any other suitable means for securing the shaft to the head plate are intended to be embraced within this disclosure.

Reel frame 14 may be made of any suitable material such as aluminum or stainless steel. Reel stand 18 may be punched out of the material forming the frame or it may be formed as a separate piece and suitably secured thereto. Head cap 10, end plate 12 and spool 20 are formed of any suitable synthetic plastic according to standard practice in the art. Spool 20 may be formed as an integral casting or one or both end rings may be separately formed and suitably secured to the spool body.

The actuating mechanism for the spool is carried on the inner face of the head cap 10. To this end the head cap 10 is provided with an elongated recess 66 and a communicating cylindrical recess 127 which may be slightly deeper than the recess 66. Adjacent one end of the recess 66 is an arched cam slot 170 extending completely through the head cap 10, the purpose of which will be more fully explained hereinafter.

Figure 3:
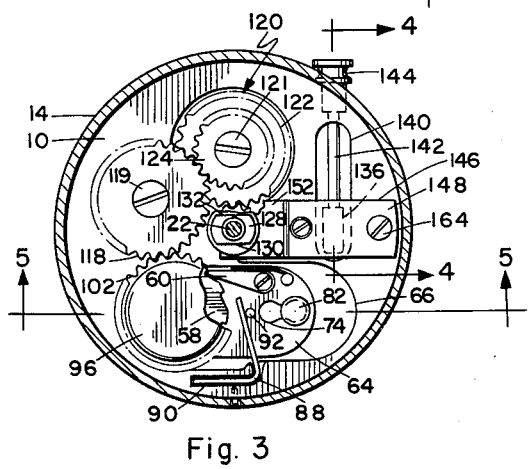
FIGURE 3 is a sectional view on the line 3—3 of FIGURE 2 showing the speed change gearing.
Figure 5:
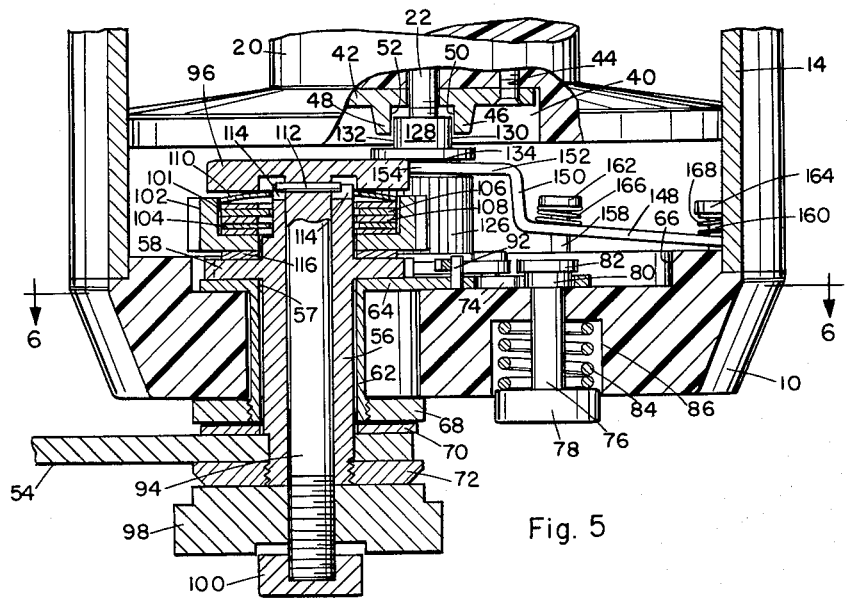
FIGURE 5 is a sectional view on the line 5—5 of FIGURE 3 showing details of the friction drag.

Slidably positioned in recess 66 is a carrier illustrated as a flat elongated mounting plate 64. Recess 66 is larger than mounting plate 64 to permit the mounting plate to be moved and retained at either of two positions. As shown in FIGURES 3 and 5 the right hand end of mounting plate 64 is provided with a generally 8-shaped slot 74. Extending thru this slot is a locking pin 76 having an enlarged actuating head 78 axially slidably mounted in recess 86 of head cap 10. The inner end of the locking pin is provided with a circular retaining flange 82 and an intermediate circular locking portion 80. The diameter of locking portion 80 is only slightly less than the diameter of the circular portion of the 8-shaped opening 74. Compression spring 84 forces the locking pin outwardly to maintain engagement of portion 80 in one or the other of the circular portions in 8-shaped slot 74. It will be readily apparent that, if pressure is applied to actuating head 78 to overcome the compression of spring 84 locking portion 80 will be disengaged from the 8-shaped slot permitting mounting plate 64 to be moved to the right as viewed in FIGURE 3. Mounting plate 64 is constantly urged in this direction by generally L-shaped spring 88, one leg of which is secured in recess 90 in head cap 10 and the other leg of which engages a pin 92 fixed to plate 64.

The left hand end of mounting plate 64 is provided with a circular opening 57 and, coaxial therewith, a cylindrical bearing flange 62, the outer end of which is screw threaded to accept securing nut 68. Journalled for rotation in bearing sleeve 62 is a hollow drive shaft 56. Crank handle 54 is non-rotatably secured to drive shaft 56 by means of nut 72. Thrust washer 70 is positioned between crank handle 54 and nut 68. To prevent reverse rotation of drive shaft 56 it is provided, adjacent its inner end, with a ratchet wheel 58 which is engaged by a spring pressed pawl 60 pivotally secured to mounting plate 64.

A driving gear 102 is operatively connected to the inner end of drive shaft 56 by means of a conventional friction coupling or coupling positioned in recess 101. This coupling may consist of clutch plates 104 and 106 alternate ones of which are splined to the drive shaft and drive gear respectively. Leather discs 108 may be used if desired to separate clutch plates 104 and 106.

A stud shaft 94 is slidably mounted in hollow drive shaft 56. A pin 112 extending diametrically through the inner end of stud shaft 94 engages slots 114 in the inner end of drive shaft 56. This insures rotation of the stud shaft with the drive shaft but permits stud shaft to move axially relative to the drive shaft. Inner end of stud shaft 94 is provided with a head or flange portion 96 which overlaps recess 101 in gear 102. A Bellville spring 110 is positioned between head 96 and the nested clutch plates 104, 106. The outer end of stud shaft 94 is screw threaded for reception of an adjustment member 98.

A series of idler gears forming speed change gearing is mounted on the head cap 10. First idler gear 118 is rotatably mounted on fixed stud 119 and adapted to mesh with drive gear 102. An idler gear cluster, indicated generally by reference numeral 120 consists of a large gear 122 and an integral pinion 124 rotatably mounted on stud 121. Idler 118 and pinion 124 are constantly in mesh. Large gear 122 is constantly in mesh with driven pinion 126 which is slidably and rotatably mounted on fixed shaft means 32.

Spool 20 is releasably coupled to driven gear 126 to permit free wheeling of the spool during casting. To this end spool 20 is provided with a recess 40 in which clutch plate 42 is mounted by screw means 44. Lugs 46, 48 having parallel confronting faces 50, 52 respectively, extend axially of clutch plate 42. Driven pinion 126 is provided with an axially extending boss 128 having plain parallel side faces 130, 132 which are spaced apart slightly less than the faces 50, 52 to provide an interengaging releasable driving connection between the driven pinion 126 and spool 20.

Actuation of the spool clutch is effected by means of a cam operating shaft mounted in head cap 10. Knob 144 provides an accessible means for reciprocating shaft 142 and its associated cam 136 which is provided with a tapered cam surface in engagement with a clutch actuating bar or plate indicated generally by the reference numeral 146. This plate 146 consists of a central body part 150 and oppositely extending offset arms 148 and 152. Arm 148 is provided with holes thru which extends studs 158 and 160 having enlarged heads 162 and 164 respectively. Compression spring 166 is mounted between head 162 of stud 158 and arm 148 and a similar compression spring 168 is mounted between head 164 and stud 160 and arm 148. A hinged connection between the outer end of arm 148 and head cap 10 may be used in place of the stud 160 if desired. Arm 150 is formed at its inner end with yoke arms 154, 156 rotatably engaging an annular groove 134 in the driven pinion 126.

Figure 4:
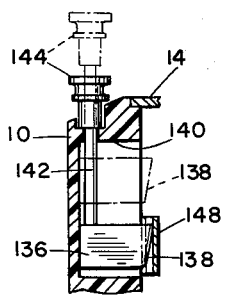
FIGURE 4 is a sectional view of the clutch actuator taken on the line 4—4 of FIGURE 3.

With reference to FIGURES 3, 4, and 5 it will be seen that with cam 136 in the position shown in solid lines in FIGURE 4 plate 146 will be forced upwardly, to the position shown in FIGURE 5, compressing spring 166. This will effect engagement of driven pinion 126 with spool 20 thru clutch elements 46, 48 and 128. Movement of the knob 144 to the position shown in dotted lines in FIGURE 4 will release the cam 136 from engagement with clutch operator 146 and spring 166 will expand causing clutch operator 146 to move downwardly, as viewed in FIGURE 5 thereby releasing driven pinion 126 from driving connection with spool 20. The spool will now be in the free wheeling position.

Figure 6:
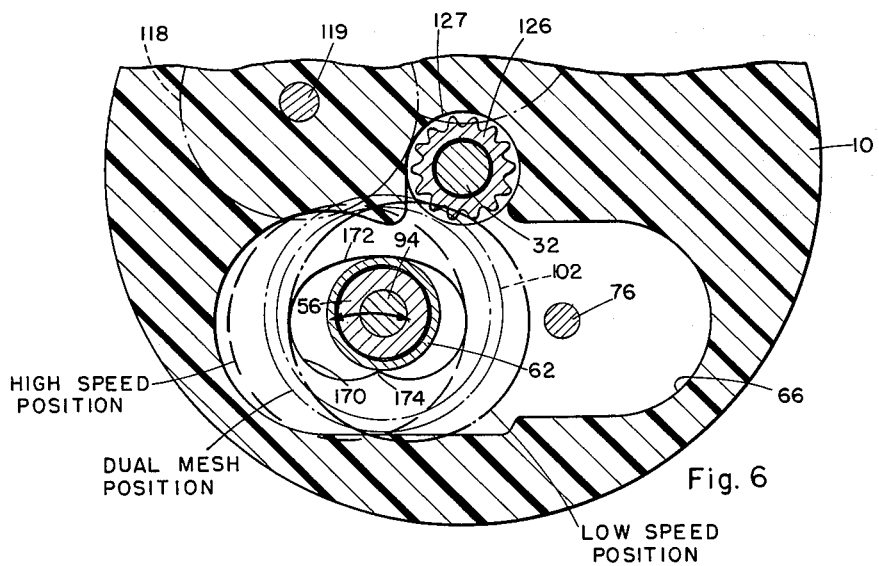
FIGURE 6 is a sectional view on the line 6—6 of FIGURE 5 illustrating movement of the driving shaft from a high speed to a low speed position.

FIGURE 6 illustrates graphically movement of the drive gear from a high speed to a low speed position. This movement is effected through the use of a cam slot 170 of substantially arcuate shape. When locking pin 76 is depressed, mounting plate 64, along with drive gear 102 carried thereby, is free to move longitudinally in recess 66, this movement being accomplished by exerting force in the crank handle normal to the axis of drive shaft 56. The path of movement is determined by the shape of slot 170, cam face 172 and re-entrant portion 174 of cam face 172.

The high speed drive position of the reel is shown by the dash line at the left hand side of FIGURE 6, this line representing the addendum diameter of drive gear 102. The addendum diameter of idler gear 118 is shown in broken lines. It will be noted that the two circles overlap indicating that drive gear 102 and idler gear 118 are in meshing engagement. Rotation of the driving gear will now be transmitted through idler gear 118, pinion gear 124 and gear 122 to the driven pinion 126. This provides a relatively high speed drive for the pinion 128. The heavy broken line indicates the other extreme of movement of drive gear 102. In this position drive gear 102 is completely disengaged from idler gear 118 and in full engagement with the driven sprocket. Motion is therefore transmitted directly from the drive gear to the driven pinion, the idler gearing being bypassed. This is the low speed position of the drive. The two concentric circles shown by light broken lines indicate the dedendum and addendum diameter of the drive gear in intermediate position. It will be noted that drive gear 102 is now in locked, dual mesh position, that is, it is partially in engagement with idle gear 118 and partially in engagement with driven pinion 126. It is evident, therefore, that when shifting from a high speed to a low speed drive there is never any free wheeling of the spool. This is an important aspect of my novel drive for it permits the spool to be under the control of the operator at all times.

It will be readily apparent that the size and shape of the slot 170, cam surface 172 and re-entrant portion 174 will vary depending on the relative size and spacing of the gears 102, 118 and 126. The gear teeth on all the gears have the same pitch and they may be of spur or helical configuration as desired.

While there has been disclosed herein what is at present considered a preferred embodiment of the invention, it will be obvious to those skilled in the art that many modifications and changes may be made therein without departing from the essence of the invention. It is therefore to be understood that the exemplary embodiment is illustrative and not restrictive of the invention, the scope of which is defined in the appended claims, and that all modifications that come within the meaning and range of equivalency of the claims are intended to be included therein.

I claim:
1. A fishing reel comprising:
   a frame;
   a head cap;
   an end plate;
   fixed shaft means connecting said head cap and end plate at opposite ends of said frame;
   a spool journalled for rotation on said fixed shaft means;
   a slidable mounting plate carried by said head cap on the side thereof adjacent said spool;
   a drive shaft journalled in said slidable mounting plate;
   a drive gear operatively connected to one end of said drive shaft;
   a crank operatively connected to the other end of said drive shaft;
   a driven pinion axially and rotatably mounted on said fixed shaft means;
   coupling means between said driven pinion and said spool;
   change speed gearing constantly in mesh with said driven pinion; and
   means on said head cap to guide said slidable mounting plate from a position where said drive gear is in engagement with said speed change gearing only to a position where said drive gear is in engagement with said driven pinion only said last named means being so dimensioned that the drive gear will engage the driven pinion before it is completely disengaged from the change speed gearing.

2. The combination of claim 1 in which said last named means includes an arcuate shaped slot in said head cap.

3. The combination of claim 2 further including a cylindrical bearing sleeve integral with said slidable gear plate and guided in said arcuate shaped slot.

4. A finishing reel comprising:
a frame;
a head cap;
an end plate;
fixed shaft means connecting said head cap, end plate and frame together;
a spool jouranlled for rotation on said shaft means;
a slidable mounting plate carried by said head cap on the side thereof adjacent said spool;
a drive shaft journalled in said slidable mounting plate;
a drive gear operatively connected to one end of said drive shaft;
a crank connected to the other end of said drive shaft;
a first idler gear rotatably mounted on said head cap;
a second idler gear rotatably mounted on said head cap and including an integral pinion in mesh with said first idler gear;
a driven pinion slidably mounted on said fixed shaft means meshing with said second idler gear; and
means on said one side plate to guide said slidable plate from a position where said drive gear is in engagement with said first idler gear only to a position where said drive gear is in engagement with said driven pinion only said last mentioned means being so dimensioned that the drive gear will engage the driven pinion before it is completely disengaged from the first idler gear.

5. In a fishing reel having a frame, a head cap, an end plate and fixed shaft means connecting said head cap, end plate and frame together, a two speed transmission comprising:
a slidable mounting plate carried by said head cap;
a drive shaft journalled in said slidable mounting plate;
a drive gear operatively connected to one end of said drive shaft;
a driven pinion journalled on said fixed shaft means;
a first idler gear rotatably mounted on said head cap;
a second idler gear rotatably mounted on said head cap and including an integral pinion in mesh with said first idler gear, said driven pinion being in mesh with said second idler gear; and
means on said head cap to guide said slidable plate from a position where said drive gear is in engagement with said first idler gear only to a position where said drive gear is in engagement with said driven pinion only, said last mentioned means being so dimensioned that the drive gear will engage the driven pinion before it is completely disengaged from the first idler gear.

6. A two-speed transmission comprising:
a support;
a slidable mounting plate carried by said support;
a drive shaft journalled in said slidable mounting plate;
a drive gear operatively connected to said drive shaft;
a driven pinion rotatably mounted on said support;
a first idler gear rotatably mounted on said support;
a second idler gear rotatably mounted on said support in mesh with said driven pinion and including an integral pinion in mesh with said first idler gear; and
means on said support to guide said mounting plate from a position where said drive gear is in engagement with said first idler gear only, to a position where said drive gear is in engagement with said driven pinion only, said last-mentioned means being so dimensioned that the drive gear will engage the driven pinion before it is completely disengaged from the first idler gear.

7. In a fishing reel:
a frame;
a head cap;
a spool rotatably mounted in said frame;
a pinion gear rotatably mounted in said frame, interengaging clutch means on said spool and pinion gear;
change speed gearing operatively mounted in said frame and in constant mesh with said pinion gear;
a slidable mounting plate carried by said head cap;
a drive gear mounted on said mounting plate;
said mounting plate being shiftable into three positions, and said drive gear being correspondingly selectively in mesh with said pinion gear only, in mesh with said change speed gearing only, and in an intermediate position in mesh with both said pinion gear and change speed gearing; and
a crank operatively connected to said drive gear and carried by said slidable mounting plate to provide for manual shifting of said plate and drive gear into said three positions.

8. Apparatus according to claim 7 wherein said crank is manually shiftable in an arched path and in a plane normal to its axis of rotation and said drive gear is connected with and shifted by said crank.

9. Apparatus according to claim 8 wherein said frame has an arched slot defining said arched path, and said drive gear has guiding means operatively positioned in said slot.

References Cited by the Examiner
UNITED STATES PATENTS

| | | | |
|---|---|---|---|
| 633,687 | 9/1899 | Craig | 74—354 |
| 1,971,724 | 8/1934 | Mathieu | 242—84.44 |
| 2,150,088 | 3/1939 | White | 242—84.54 |
| 2,354,530 | 7/1944 | McMahon | 242—84.44 |
| 2,553,200 | 5/1951 | Mandolf et al. | 242—84.54 X |
| 2,621,869 | 12/1952 | McCash | 242—84.44 X |
| 2,760,357 | 8/1956 | Burns | 242—84.45 X |
| 2,918,227 | 12/1959 | Mauborgne | 242—84.21 |
| 2,978,201 | 4/1961 | Polevoy | 242—84.54 |

MERVIN STEIN, *Primary Examiner.*